United States Patent
Nairn et al.

(10) Patent No.: US 10,144,201 B2
(45) Date of Patent: Dec. 4, 2018

(54) MULTILAYER POLYPROPYLENE FILMS AND METHODS OF MAKING AND USING THE SAME

(71) Applicant: FINA TECHNOLOGY, INC., Houston, TX (US)

(72) Inventors: Lea Ann Nairn, League City, TX (US); Marco Vinicio Araya Vargas, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 496 days.

(21) Appl. No.: 14/856,051

(22) Filed: Sep. 16, 2015

(65) Prior Publication Data

US 2016/0001531 A1   Jan. 7, 2016

Related U.S. Application Data

(62) Division of application No. 12/552,137, filed on Sep. 1, 2009, now Pat. No. 9,174,384.

(51) Int. Cl.

| | |
|---|---|
| *B32B 27/08* | (2006.01) |
| *B29C 47/00* | (2006.01) |
| *B29C 47/02* | (2006.01) |
| *B29C 59/10* | (2006.01) |
| *B32B 27/32* | (2006.01) |
| *B32B 15/085* | (2006.01) |
| *B32B 17/06* | (2006.01) |
| *B32B 21/08* | (2006.01) |
| *B32B 27/10* | (2006.01) |
| *B32B 27/12* | (2006.01) |
| *B29C 59/08* | (2006.01) |
| *B29C 59/14* | (2006.01) |
| *B29K 23/00* | (2006.01) |
| *B29L 9/00* | (2006.01) |
| *B32B 37/15* | (2006.01) |
| *B32B 37/20* | (2006.01) |
| *B32B 37/22* | (2006.01) |

(52) U.S. Cl.
CPC .......... *B32B 27/08* (2013.01); *B29C 47/0021* (2013.01); *B29C 47/02* (2013.01); *B29C 59/10* (2013.01); *B32B 15/085* (2013.01); *B32B 17/064* (2013.01); *B32B 21/08* (2013.01); *B32B 27/10* (2013.01); *B32B 27/12* (2013.01); *B32B 27/32* (2013.01); *B32B 27/327* (2013.01); *B29C 59/08* (2013.01); *B29C 59/14* (2013.01); *B29K 2023/083* (2013.01); *B29K 2023/12* (2013.01); *B29L 2009/00* (2013.01); *B32B 37/153* (2013.01); *B32B 37/203* (2013.01); *B32B 37/223* (2013.01); *B32B 2250/00* (2013.01); *B32B 2250/02* (2013.01); *B32B 2250/24* (2013.01); *B32B 2250/242* (2013.01); *B32B 2307/31* (2013.01); *B32B 2307/514* (2013.01); *B32B 2307/518* (2013.01); *B32B 2309/02* (2013.01); *B32B 2309/105* (2013.01); *B32B 2310/14* (2013.01); *B32B 2439/00* (2013.01); *B32B 2553/00* (2013.01); *Y10T 428/31913* (2015.04)

(58) Field of Classification Search
None
See application file for complete search history.

(56) References Cited

U.S. PATENT DOCUMENTS

| | | | |
|---|---|---|---|
| 2001/0049004 A1 | 12/2001 | Wilkie | |
| 2004/0146730 A1* | 7/2004 | Holzer | B29C 55/023 428/515 |
| 2007/0215610 A1* | 9/2007 | Su | B32B 27/08 219/730 |

FOREIGN PATENT DOCUMENTS

WO   2004022336 A1   3/2004

OTHER PUBLICATIONS

Extended European Search Report issued in Application No. 10814359.5, dated Nov. 9, 2015, 4 pages.

* cited by examiner

*Primary Examiner* — Robert T Butcher
(74) *Attorney, Agent, or Firm* — Albert Shung

(57) ABSTRACT

A method including forming a bilayer polymer film having an oriented polypropylene film and a metallocene-catalyzed polypropylene film wherein the metallocene-catalyzed polypropylene film has a seal initiation temperature of from 80° C. to 130° C. A laminate including a biaxially oriented polypropylene film, a metallocene-catalyzed polypropylene film, and a substrate, wherein the metallocene-catalyzed polypropylene film is disposed between the biaxially oriented polypropylene film and the substrate.

12 Claims, 13 Drawing Sheets

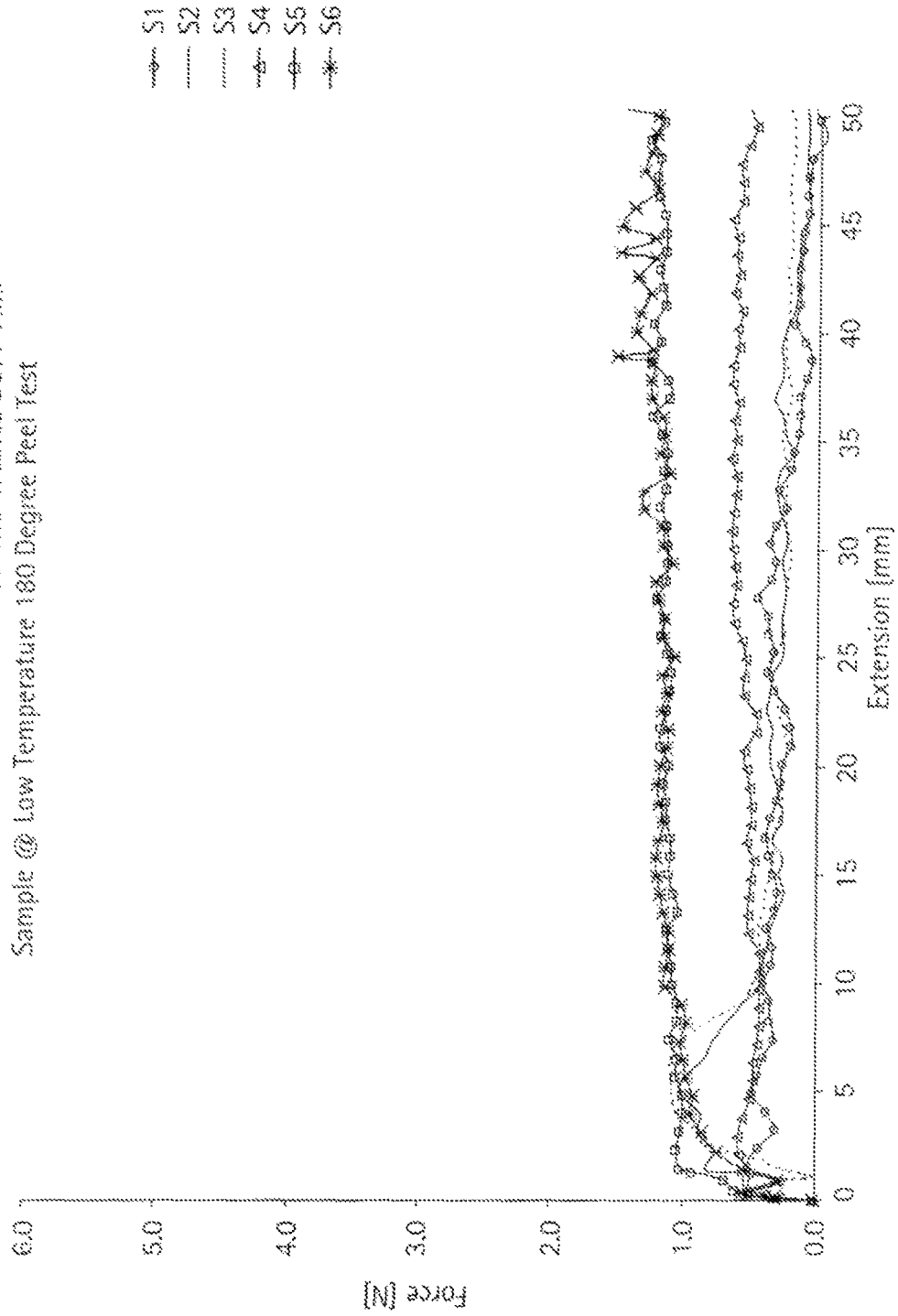

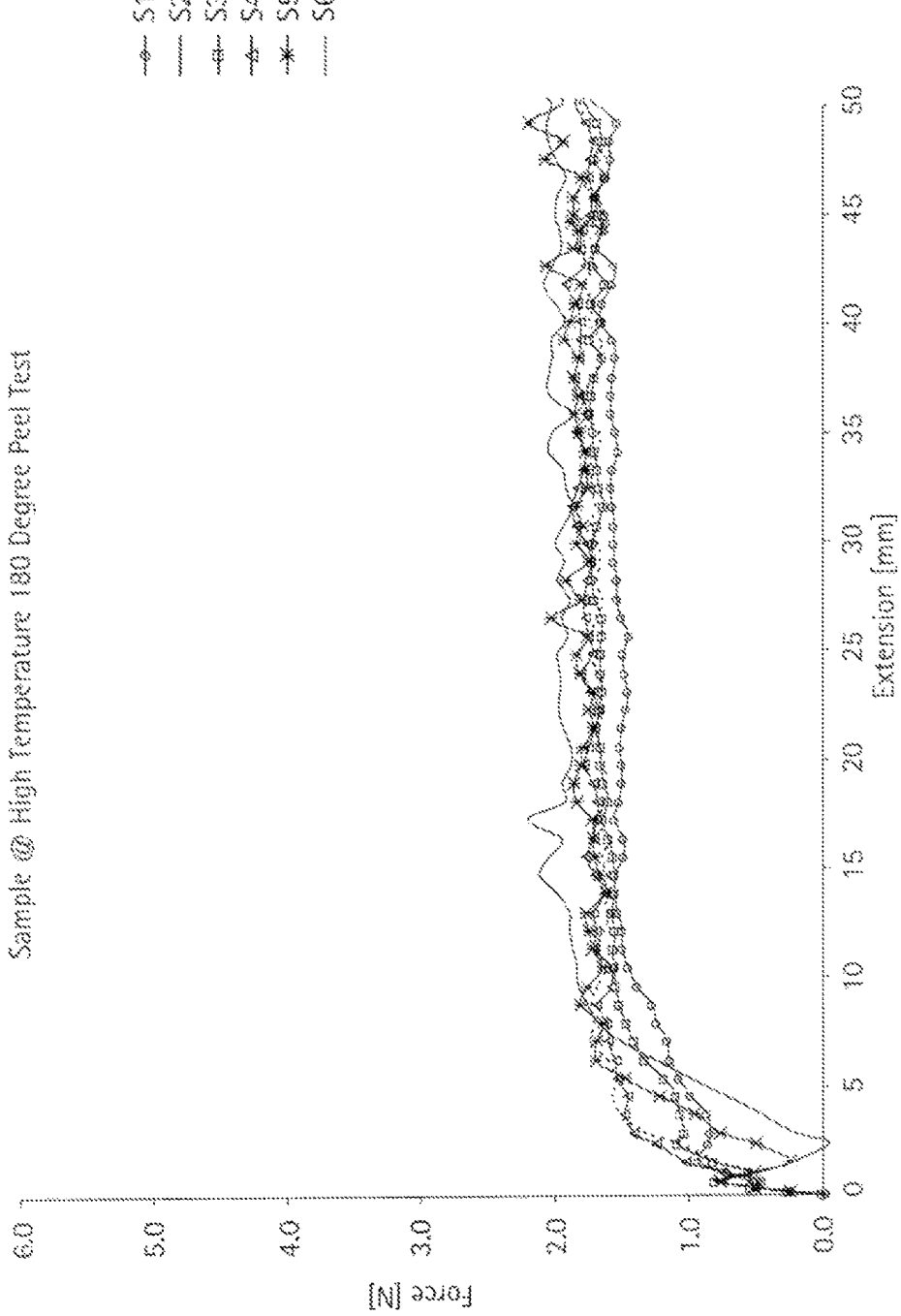

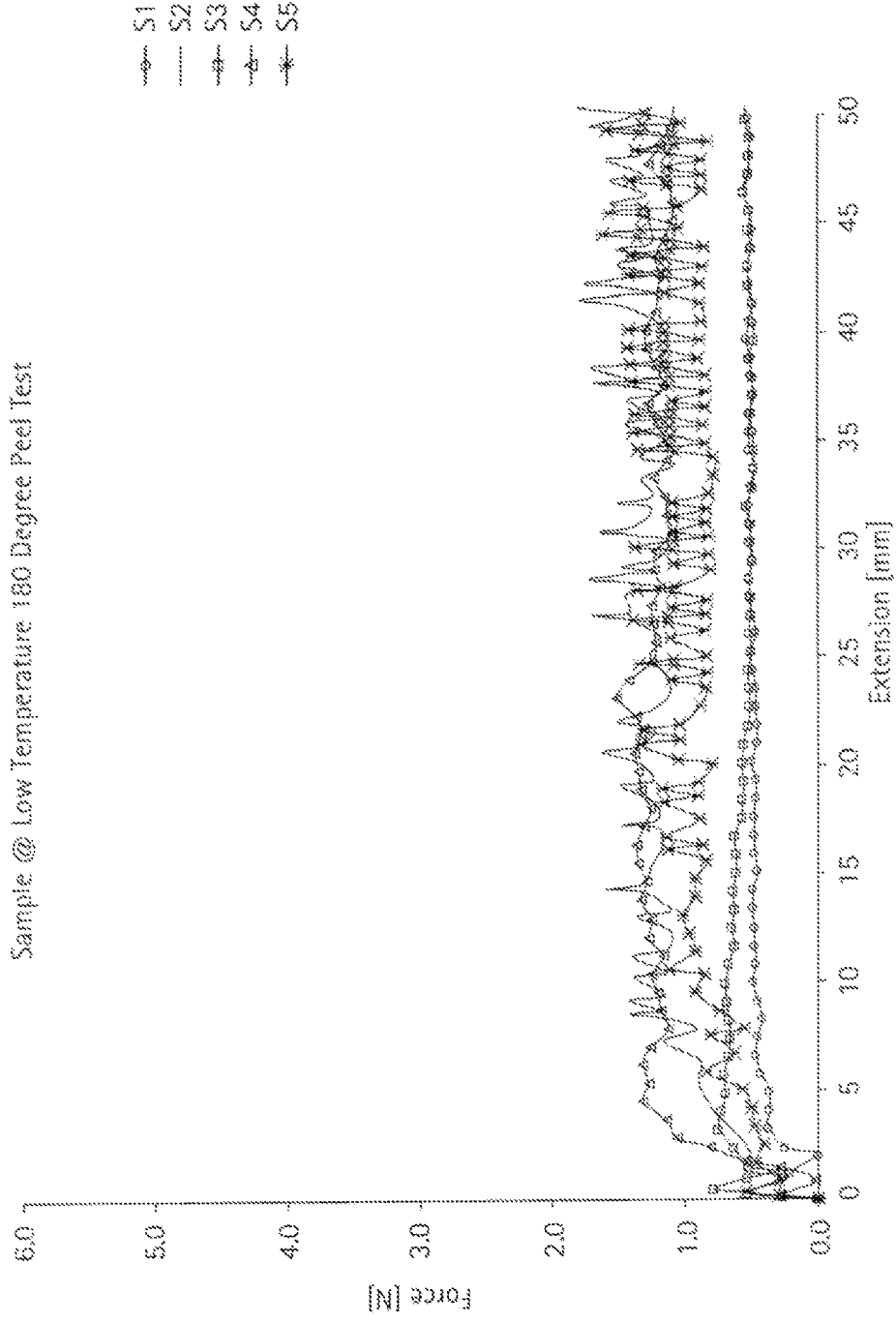

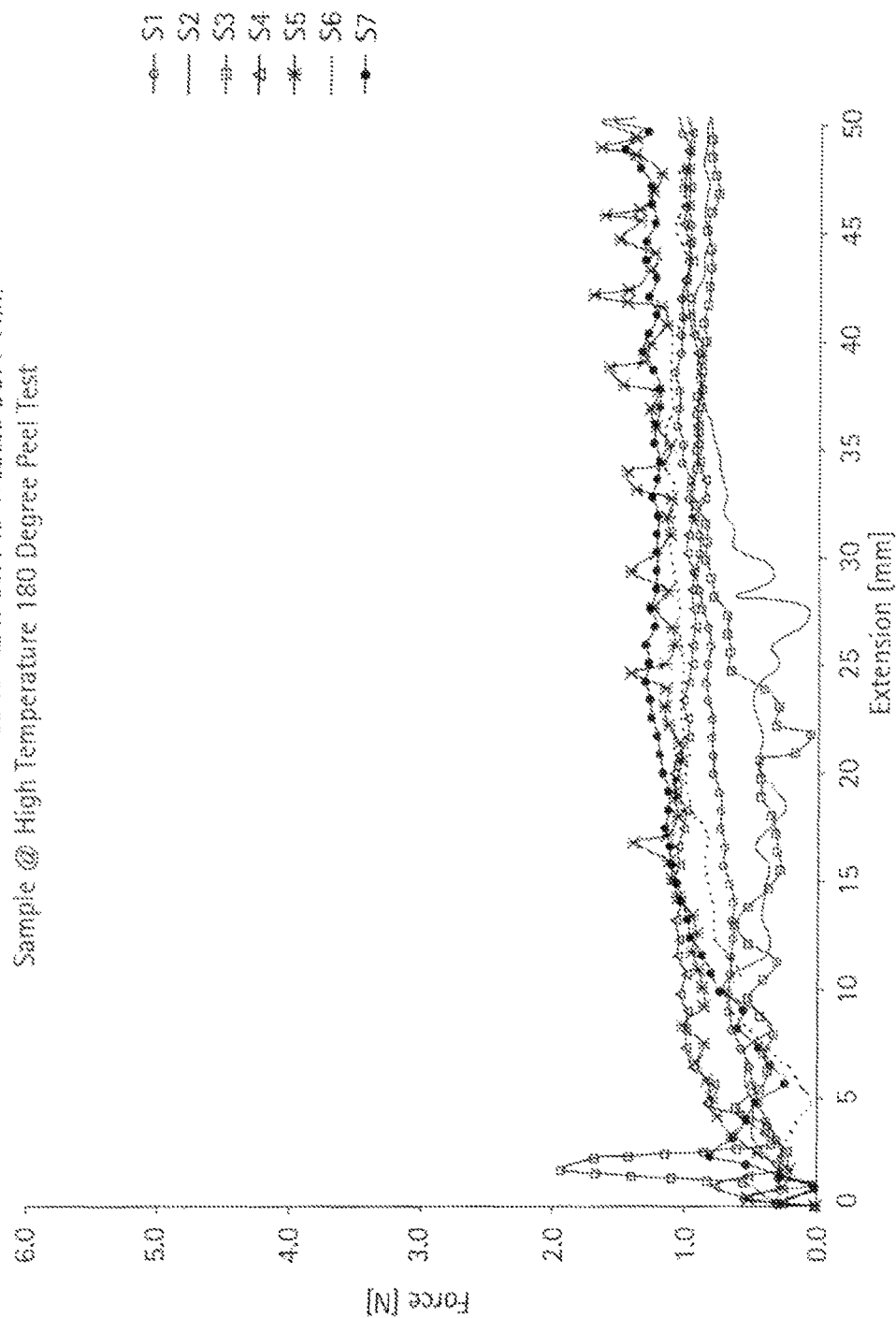

180 Degree Peel Test - EOD02-15 and EOD07-21 Extrusion Coated to Plain Corona-Treated BOPP Film Samples

MULTILAYER POLYPROPYLENE FILMS AND METHODS OF MAKING AND USING THE SAME

CROSS-REFERENCE TO RELATED APPLICATIONS

This application is a Divisional of U.S. patent application Ser. No. 12/552,137, filed on Sep. 1, 2009, the entirety of which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable

BACKGROUND

Technical Field

This disclosure relates to methods of preparing polypropylene films. More specifically, this disclosure relates to multi-layer polypropylene films for use in thermo-lamination applications and methods of making and using same.

Background

Synthetic polymeric materials, particularly polypropylene resins, are manufactured into a variety of end-use articles ranging from medical devices to materials packaging. Many industries, such as the packaging industry, utilize these polypropylene materials in various manufacturing processes to create a variety of finished goods including containers, packaging films for food packaging, thermo-lamination films for book covers, etc. For example, producing thermo-lamination films may involve extruding a layer of ethylene vinyl acetate (EVA) onto a plastic film (e.g., polypropylene) to form a bilayer film. Next, the EVA side of the bilayer film may be thermo-laminated to different types of substrates (e.g., paper, wood, etc.) to form polypropylene-EVA laminates.

One challenge to the utility of polypropylene-EVA laminates is achieving sufficient bond strength between the polypropylene film and the EVA layer. In order to improve the bonding between these layers, a tie layer may be placed between the polypropylene film and the EVA layer. However, adding a tie layer increases the cost associated with producing such materials and may detrimentally affect one of more physical properties (e.g., low haze, high gloss) of the material. Thus an ongoing need exists for novel laminate compositions having desirable physical and/or mechanical properties.

SUMMARY

Disclosed herein is a method including forming a bilayer polymer film having an oriented polypropylene film and a metallocene-catalyzed polypropylene film wherein the metallocene-catalyzed polypropylene film has a seal initiation temperature of from 80° C. to 130° C. The bilayer polymer film may have of an oriented polypropylene film and a metallocene-catalyzed polypropylene film. The metallocene-catalyzed polypropylene film may have a thickness of from 0.1 mil to 20 mil. The oriented polypropylene film may include uniaxially oriented polypropylene film, biaxially oriented polypropylene film, or combinations thereof. The oriented polypropylene film may be corona treated. The oriented polypropylene film may have a thickness of from 0.1 mil to 20 mil. The bilayer polymer film may have an adhesive strength of from 0.1 lbf to 10 lbf. The bilayer polymer film may have a gloss 45° of from 60 to 99. The bilayer polymer film may have a haze percentage of from 0.5% to 10%. The bilayer polymer film may have a thickness of from 0.2 mil to 20 mil. The forming of the bilayer polymer film may occur at a temperature of from 420° F. to 530° F. The forming of the bilayer polymer film may occur by extrusion coating the metallocene-catalyzed polypropylene film onto the biaxially oriented polypropylene film. The method may further include thermolaminating the bilayer polymer film with a substrate to form a laminate wherein the metallocene-catalyzed polypropylene film is disposed between the biaxially oriented polypropylene film and the substrate. The substrate may include paper, plastic, metal, wood, fabric, glass or combinations thereof. The laminate may be substantially free of ethylene-vinyl-acetate. The oriented polypropylene film may be subjected to a surface modification process. An article as produced by any of the previously disclosed methods.

Also disclosed herein is a laminate including a biaxially oriented polypropylene film, a metallocene-catalyzed polypropylene film, and a substrate wherein the metallocene-catalyzed polypropylene film is disposed between the biaxially oriented polypropylene film and the substrate. The metallocene-catalyzed polypropylene film may have a seal initiation temperature of from 80° C. to 130° C. The laminate may be substantially free of ethylene-vinyl-acetate.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3 is a plot of force as a function of extension for the 180° peel test results for Sample 1 from Example 1.

FIG. 4 is a plot of force as a function of extension for the 180° peel test results for Sample 2 from Example 2.

FIG. 5 is a plot of force as a function of extension for the 180° peel test results for Sample 3 from Example 3.

FIG. 6 is a plot of force as a function of extension for the 180° peel test results for Sample 4 from Example 4.

DETAILED DESCRIPTION

Figure 1:
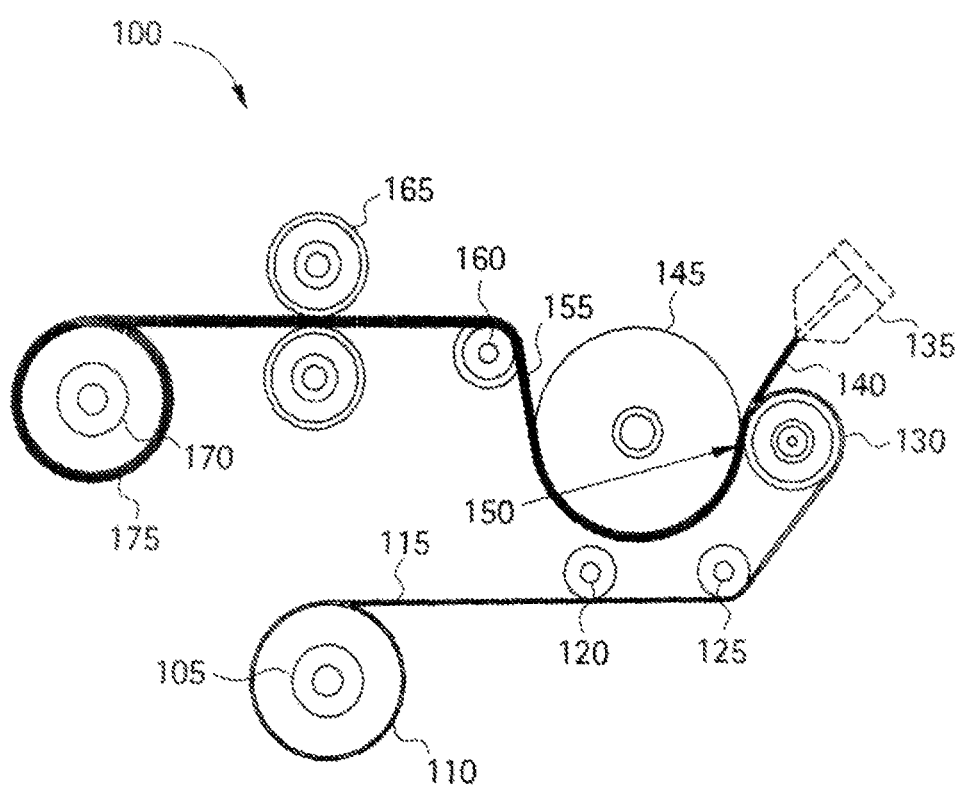
FIG. 1 is a schematic diagram of an extrusion coating apparatus.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein oriented polypropylene is designated "oPP;" metallocene-catalyzed polypropylene is designated "mPP;" bilayer polymer film is designated "BPF;" biaxially oriented polypropylene is designate "BOPP;" high crystallinity polypropylene is designated "HCPP;" polypropylene heterophasic copolymers are designated "PPHC;" ethylene propylene rubber is designated "EPR;" melt flow rate is designated "MFR;" metallocene-catalyzed random ethylene propylene copolymer is designated "mREPC;" seal initiation temperature is designated "SIT;" percentage xylene solubles is designated "XS %;" and ethylene vinyl acetate is designated "EVA."

Disclosed herein are multilayer polymer films and methods of making and using same. The multilayer polymer films include at least one oriented polypropylene (oPP) film layer and at least one metallocene-catalyzed polypropylene (mPP) film layer. In an embodiment, the multilayer film includes greater than 2 layers, alternatively 3, 4, 5, or 6 layers. Alternatively, the multilayer film includes 2 layers. Hereinafter, for simplicity, the discussion will refer to bilayer polymer films although it is to be understood that polymer films having greater than two layers are also contemplated.

In an embodiment, a bilayer polymer film (BPF) may have an oriented polypropylene (oPP) film layer and a metallocene-catalyzed polypropylene (mPP) film layer.

In an embodiment, the BPF includes an oriented polypropylene film layer. The polypropylene may be a homopolymer, a high crystallinity polypropylene, a polypropylene heterophasic copolymer, or combinations (e.g., blends) thereof. The polypropylene may be formed into a film and oriented to produce an oriented polypropylene film layer as described in more detail herein.

The polypropylene may be a homopolymer provided however that the homopolymer may contain up to 5% of another alpha-olefin, including but not limited to $C_2$-$C_8$ alpha-olefins such as ethylene and 1-butene. Despite the potential presence of small amounts of other alpha-olefins, the polypropylene is generally referred to as a polypropylene homopolymer (or substantially a homopolymer). Polypropylene homopolymers suitable for use in this disclosure may include any type of polypropylene known in the art with the aid of this disclosure. For example, the polypropylene homopolymer may be, isotactic polypropylene, hemi-isotactic, or combinations thereof. A polymer is "isotactic" when all of its pendant groups are arranged on the same side of the chain. In hemi-isotactic polymer, every other repeat unit has a random substituent.

A polypropylene suitable for use in this disclosure may be characterized by a number average molecular weight Mn of from $3.3 \times 10^4$ Daltons to $8.3 \times 10^4$ Daltons, alternatively from $4.1 \times 10^4$ Daltons to $7.5 \times 10^4$ Daltons, alternatively from $5.0 \times 10^4$ Daltons to $6.6 \times 10^4$ Daltons; a weight average molecular weight of from $3.0 \times 10^5$ Daltons to $6.2 \times 10^5$ Daltons, alternatively from $3.5 \times 10^5$ Daltons to $5.7 \times 10^5$ Daltons, alternatively from $4.0 \times 10^5$ Daltons to $5.1 \times 10^5$ Daltons; a polydispersity index of from 4.9 to 11.0, alternatively from 6.0 to 10.0, alternatively from 7.0 to 9.0; and a z-average molecular weight of from $9.7 \times 10^5$ Daltons to $3.2 \times 10^6$ Daltons, alternatively from $1.3 \times 10^6$ Daltons to $2.8 \times 10^6$ Daltons, alternatively from $1.7 \times 10^6$ Daltons to $2.5 \times 10^6$ Daltons. Specifically, for a polymeric composition the number-average molecular weight $M_n$ is given by equation 1:

$$M_n = \Sigma N_x M_x \quad (1)$$

where $N_x$ is the mole-fraction (or the number-fraction) of molecules whose weight is $M_x$. The weight-average molecular weight $M_w$ is given by equation 2:

$$M_w = \Sigma w_x M_x \quad (2)$$

where $w_x$ is the weight-fraction of molecules whose weight is $M_x$. The polydispersity index (PDI) is given by equation 3:

$$PDI = M_w/M_n \quad (3)$$

The z-average molecular weight ($M_z$) is given by equation 4:

$$M_z = \Sigma w_x M_x^2 / \Sigma w_x M_x \quad (4)$$

where $w_x$ is the weight-fraction of molecules whose weight is $M_x$.

In an embodiment, a polypropylene suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melting temperature of from 150° C. to 170° C., alternatively from 155° C. to 168° C., and alternatively from 160° C. to 165° C. as determined by differential scanning calorimetry; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238 condition "L"; a tensile modulus of from 200,000 psi to 350,000 psi; alternatively from 220,000 psi to 320,000 psi, and alternatively from 250,000 psi to 320,000 psi as determined in accordance with ASTM D638; a tensile stress at yield of from 3,000 psi to 6,000 psi, alternatively from 3,500 psi to 5,500 psi, and alternatively from 4,000 psi to 5,500 psi as determined in accordance with ASTM D638; a tensile strain at yield of from 5% to 30%, alternatively from 5% to 20%, and alternatively from 5% to 15% as determined in accordance with ASTM D638; a flexural modulus of from 120,000 psi to 330,000 psi, alternatively from 190,000 psi to 310,000 psi, and alternatively of from 220,000 psi to 300,000 psi as determined in accordance with ASTM D790; a Gardner impact of from 3 in-lb to 50 in-lb, alternatively from 5 in-lb to 30 in-lb, and alternatively from 9 in-lb to 25 in-lb as determined in accordance with ASTM D2463; a Notched Izod Impact Strength of from 0.2 ft lb/in to 20 ft lb/in, alternatively from 0.5 ft lb/in to 15 ft lb/in, and alternatively from 0.5 ft lb/in to 10 ft lb/in as determined in accordance with ASTM D256A; a hardness shore D of from 30 to 90, alternatively from 50 to 85, and alternatively from 60 to 80 as determined in accordance with ASTM D2240; and a heat distortion temperature of from 50° C. to 125° C., alternatively from 80° C. to 115° C., and alternatively from 90° C. to 110° C. as determined in accordance with ASTM D648.

Examples of polypropylene homopolymers suitable for use in this disclosure include without limitation grades 3371, 3271, 3270, 3276, and 3377, which are polypropylene homopolymers commercially available from Total Petrochemicals USA, Inc. In an embodiment, the polypropylene homopolymer (e.g., grade 3377) has generally the physical properties set forth in Table 1.

TABLE 1

| Properties | Typical Value | Test Method |
|---|---|---|
| Resin properties | | |
| Density, g/cc | 0.905 | ASTM D1505 |
| Melt Flow Rate (MFR), g/10 min. | 3.5 | ASTM D1238 condition "L" |
| Melting Point, ° F. | 325 | DSC |

TABLE 1-continued

| Properties | Typical Value | Test Method |
|---|---|---|
| Film Properties, Oriented | | |
| Haze, % | 1 | ASTM D1003 |
| Gloss 45° | 90 | ASTM D 2457 |
| Ultimate tensile MD, psi | 19,000 | ASTM D 882 |
| Ultimate tensile TD, psi | 38,000 | ASTM D 882 |
| Tensile modulus, MD, psi | 350,000 | ASTM D 882 |
| Tensile modulus, TD, psi | 600,000 | ASTM D 882 |
| Elongation MD, % | 130 | ASTM D 882 |
| Elongation TD, % | 50 | ASTM D 882 |
| WVTR, g/100 in2/24 h/mil at 100° F., 90% RH | 0.3 | ASTM F-1249-90 |

In another embodiment, the polypropylene may be a high crystallinity polypropylene homopolymer (HCPP). The HCPP may contain primarily isotactic polypropylene. The isotacticity in polymers may be measured via $^{13}$C NMR spectroscopy using meso pentads and can be expressed as percentage of meso pentads (% mmmm). As used herein, the term "meso pentads" refers to successive methyl groups located on the same side of the polymer chain. In an embodiment, the HCPP has a meso pentads percentage of greater than 97%, or greater than 98%, or greater than 99%. The HCPP may have some amount of atactic or amorphous polymer. The atactic portion of the polymer is soluble in xylene, and is thus termed the xylene soluble fraction (XS %). In determining XS %, the polymer is dissolved in boiling xylene and then the solution cooled to 0° C. that results in the precipitation of the isotactic or crystalline portion of the polymer. The XS % is that portion of the original amount that remained soluble in the cold xylene. Consequently, the XS % in the polymer is indicative of the extent of crystalline polymer formed. The total amount of polymer (100%) is the sum of the xylene soluble fraction and the xylene insoluble fraction, as determined in accordance with ASTM D5492-98. In an embodiment, the HCPP has a xylene soluble fraction of less than 1.5%, or less than 1.0%, or less than 0.5%.

In an embodiment, an HCPP suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238; a secant modulus in the machine direction (MD) of from 350,000 psi to 420,000 psi; alternatively from 380,000 psi to 420,000 psi, and alternatively from 400,000 psi to 420,000 psi as determined in accordance with ASTM D882; a secant modulus in the transverse direction (TD) of from 400,000 psi to 700,000 psi, alternatively from 500,000 psi to 700,000 psi, and alternatively from 600,000 psi to 700,000 psi as determined in accordance with ASTM D882; a tensile strength at break in the MD of from 19,000 psi to 28,000 psi, alternatively from 22,000 psi to 28,000 psi, and alternatively from 25,000 psi to 28,000 psi as determined in accordance with ASTM D882; a tensile strength at break in the TD of from 20,000 psi to 40,000 psi, alternatively from 30,000 psi to 40,000 psi, and alternatively of from 35,000 psi to 40,000 psi as determined in accordance with ASTM D882; an elongation at break in the MD from 50% to 200%, alternatively from 100% to 180%, and alternatively from 120% to 150% as determined in accordance with ASTM D882; an elongation at break in the TD of from 50% to 150%, alternatively from 60% to 100%, and alternatively from 80% to 100% as determined in accordance with ASTM D882; a melting temperature of from 150° C. to 170° C., alternatively from 155° C. to 170° C., and alternatively from 160° C. to 170° C. as determined by differential scanning calorimetry; a gloss at 45° of from 70 to 95, alternatively from 75 to 90, and alternatively from 80 to 90 as determined in accordance with ASTM D2457; a percentage haze of from 0.5% to 2.0%, alternatively from 0.5% to 1.5%, and alternatively from 0.5% to 1.0% as determined in accordance with ASTM D1003; and a water vapor transmission rate of from 0.15 to 0.30 g-mil/100 in$^2$/day, alternatively from 0.15 to 0.25 g-mil/100 in$^2$/day, and alternatively from 0.20 to 0.21 g-mil/100 in$^2$/day as determined in accordance with ASTM F1249-90.

An example of an HCPP suitable for use in this disclosure includes without limitation grade 3270, which is an HCPP commercially available from Total Petrochemicals USA, Inc. The HCPP (e.g., grade 3270) may generally have the physical properties set forth in Table 2.

TABLE 2

| Properties | Typical Value | Test Method |
|---|---|---|
| Physical | | |
| Density, g/cc | 0.910 | ASTM D1505 |
| Melt Mass-Flow Rate (MFR) (230° C./2.16 kg), g/10 min. | 2.0 | ASTM D1238 |
| BOPP Mechanical | | |
| Secant Modulus MD, psi | 420,000 | ASTM 882 |
| Secant Modulus TD, psi | 700,000 | ASTM 882 |
| Tensile Strength at Break MD, psi | 28,000 | ASTM 882 |
| Tensile Strength at Break TD, psi | 39,000 | ASTM 882 |
| Elongation at Break MD, % | 150 | ASTM 882 |
| Elongation at Break TD, % | 60 | ASTM 882 |
| Thermal | | |
| Melting Temperature, ° F. | 329 | DSC |
| Optical | | |
| Gloss (45°) | 85 | ASTM D2457 |
| Haze, % | 1.0 | ASTM D1003 |
| Barrier | | |
| Water Vapor Transmission, 100° F., 90% R.H, g-mil/100 in$^2$/day | 0.2 | ASTM F1249-90 |

In another embodiment, the polypropylene may be a polypropylene heterophasic copolymer (PPHC) wherein a polypropylene homopolymer phase or component is joined to a copolymer phase or component. The PPHC may have from greater than 6.5% to less than 11.5% by weight ethylene, alternatively from 8.5% to less than 10.5%, alternatively from 9.5% ethylene based on the total weight of the PPHC. Herein, percentages of a component refer to the percent by weight of that component in the total composition unless otherwise noted.

The copolymer phase of a PPHC may be a random copolymer of propylene and ethylene, also referred to as an ethylene/propylene rubber (EPR). PP impact copolymers show distinct homopolymer phases that are interrupted by short sequences or blocks having a random arrangement of ethylene and propylene. In comparison to random copolymers, the block segments comprising the EPR may have certain polymeric characteristics (e.g., intrinsic viscosity) that differ from that of the copolymer as a whole. In an embodiment, the EPR portion of the PPHC includes greater than 14 wt. % of the PPHC, alternatively greater than 18 wt. % of the PPHC, alternatively from 14 wt. % to 18 wt. % of the PPHC.

The amount of ethylene present in the EPR portion of the PPHC may be from 38 wt. % to 50 wt. %, alternatively from 40 wt. % to 45 wt,% based on the total weight of the EPR portion. The amount of ethylene present in the EPR portion of the PPHC may be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 $cm^{-1}$/900 $cm^{-1}$ is calculated for each ethylene concentration and a calibration curve may then be constructed. Linear regression analysis on the calibration curve can then be carried out to derive an equation that is then used to determine the EPR ethylene content for a sample material.

The EPR portion of the PPHC may exhibit an intrinsic viscosity different from that of the propylene homopolymer component. Herein intrinsic viscosity refers to the capability of a polymer in solution to increase the viscosity of said solution. Viscosity is defined herein as the resistance to flow due to internal friction. In an embodiment, the intrinsic viscosity of the EPR portion of the PPHC may be greater than 2.0 dl/g, alternatively from 2.0 dl/g to 3.0 dl/g, alternatively from 2.4 dl/g to 3.0 dl/g, alternatively from 2.4 dl/g to 2.7 dl/g, alternatively from 2.6 dl/g to 2.8 dl/g. The intrinsic viscosity of the EPR portion of the PPHC is determined in accordance with ASTM D5225.

In an embodiment, the PPHC may have a melt flow rate (MFR) of from 65 g/10 min. to 130 g/10 min., alternatively from 70 g/10 min. to 120 g/10 min., alternatively from 70 g/10 min. to 100 g/10 min., alternatively from 70 g/10 min. to 90 g/10 min., alternatively from 75 g/10 min. to 85 g/10 min., alternatively 90 g/10 min. Excellent flow properties as indicated by a high MFR allow for high throughput manufacturing of molded polymeric components. In an embodiment, the PPHC is a reactor grade resin without modification, which may also be termed a low order PP. In some embodiments, the PPHC is a controlled rheology grade resin, wherein the melt flow rate has been adjusted by various techniques such as visbreaking. For example, MFR may be increased by visbreaking as described in U.S. Pat. No. 6,503,990, which is incorporated by reference in its entirety. As described in that publication, quantities of peroxide are mixed with polymer resin in flake, powder, or pellet form to increase the MFR of the resin. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM D1238.

Representative examples of suitable PPHCs include without limitation grades 4920W and 4920WZ, which are impact copolymer resins commercially available from Total Petrochemicals USA Inc. In an embodiment, the PPHC (e.g., grade 4920W) has generally the physical properties set forth in Table 3.

TABLE 3

| Properties | Typical Value | ASTM Method |
|---|---|---|
| Physical | | |
| Melt Flow, g/10 min. | 100 | D1238 |
| Density, g/cc | 0.905 | D1505 |
| Melting Point, ° C. | 160-165 | DSC |
| Mechanical | | |
| Tensile strength at Yield, psi (MPa) | 3700 (25) | D638 |
| Elongation at Yield, % | 6 | D638 |
| Flexural Modulus, psi (MPa) | 190,000 (1,300) | D790 |
| Notched-ft.lb./in. (J/m) | 1.0 (50) | ASTM D256A |
| Thermal | | |
| Heat Deflection, ° C. | 90 | D648 |

In an embodiment, the polypropylene may also contain additives to impart desired physical properties, such as printability, increased gloss, or a reduced blocking tendency. Examples of additives include without limitation stabilizers, ultra-violet screening agents, oxidants, anti-oxidants, anti-static agents, ultraviolet light absorbents, fire retardants, processing oils, mold release agents, coloring agents, pigments/dyes, fillers, and/or other additives known to one skilled in the art. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure.

The polypropylene for oPP film may be prepared using any suitable catalyst known to one or ordinary skill in the art. For example, the polypropylene may be prepared using a Ziegler-Natta catalyst.

In an embodiment, the polypropylene is prepared using Ziegler-Natta catalysts, which are typically based on titanium and organometallic aluminum compounds, for example triethylaluminum $(C_2H_5)_3Al$. Ziegler-Natta catalysts and processes for forming such catalysts are known in the art and examples of such are described in U.S. Pat. Nos. 4,298,718; 4,544,717; and 4,767,735, each of which is incorporated by reference herein.

The polypropylene may be formed by placing propylene alone in a suitable reaction vessel in the presence of a catalyst (e.g., Ziegler-Natta) and under suitable reaction conditions for polymerization thereof. Standard equipment and processes for polymerizing the propylene into a polymer are known to one skilled in the art. Such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

In an embodiment, the polypropylene is formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig, or from about 250 psig to about 350 psig. The reactor temperature in a gas phase process may vary from about 30° C. to about 120° C., or from about 60° C. to about 115° C., or from about 70° C. to about 110° C., or from about 70° C. to about 95° C., for example U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

In an embodiment, the polypropylene is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

In an embodiment, the BPF includes metallocene-catalyzed polypropylene (mPP) film layer (i.e., a film layer comprising polypropylene produced using a metallocene catalyst). The mPP may be a homopolymer or a copolymer, for example a copolymer of propylene with one or more alpha olefin monomers such as ethylene, butene, hexene, etc. In an embodiment, the mPP film includes a metallocene-catalyzed random ethylene-propylene ($C_2/C_3$) copolymer (mREPC) and may include of from 2 wt. % to 10 wt. % ethylene, alternatively from 3 wt. % to 9 wt. % ethylene, alternatively from 4 wt. % to 8 wt. % ethylene. The mPP film layer may have a seal initiation temperature (SIT) of from 80° C. to 130° C., alternatively from 95° C. to 125° C., alternatively from 90° C. to 120° C. Herein the SIT refers to the minimum sealing temperature required to form a seal of significant strength, which varies depending on the applications. Further, a mPP suitable for use in this disclosure may be characterized by a number average molecular weight Mn of from $5.1 \times 10^4$ to $9.3 \times 10^4$, alternatively from $5.8 \times 10^4$ to $8.6 \times 10^4$, alternatively from $6.5 \times 10^4$ to $7.9 \times 10^4$; a weight average molecular weight of from $1.67 \times 10^5$ to $2.20 \times 10^5$, alternatively from $1.75 \times 10^5$ to $2.11 \times 10^5$, alternatively from $1.84 \times 10^5$ to $2.02 \times 10^5$; a polydispersity index of from 2.1 to 3.3, alternatively from 2.3 to 3.1, alternatively from 2.5 to 2.9; and a z-average molecular weight of from $2.98 \times 10^5$ to $4.22 \times 10^5$, alternatively from $3.19 \times 10^5$ to $4.01 \times 10^5$, alternatively from $3.40 \times 10^5$ to $3.81 \times 10^5$.

In ethylene-propylene random copolymers, the ethylene molecules are inserted randomly into the polymer backbone between repeating propylene molecules, hence the term random copolymer. In the preparation of a mREPC a certain amount of amorphous polymer is produced. This amorphous or atactic polymer is soluble in xylene and is thus termed the xylene soluble fraction or percent xylene solubles (XS %). In determining XS %, the polymer is dissolved in hot xylene and then the solution is cooled to 0° C. which results in the precipitation of the isotactic or crystalline portion of the polymer. The XS % is that portion of the original amount that remained soluble in the cold xylene. Consequently, the XS % in the polymer is further indicative of the extent of crystalline polymer formed. In an embodiment, the mREPC has a xylene soluble fraction of from 0.1% to 6.0%; alternatively from 0.2% to 2.0%; and alternatively from 0.3% to 1.0%, as determined in accordance with ASTM D 5492-98.

In an embodiment, an mREPC suitable for use in this disclosure may have a density of from 0.890 g/cc to 0.920 g/cc, alternatively from 0.895 g/cc to 0.915 g/cc, and alternatively from 0.900 g/cc to 0.910 g/cc as determined in accordance with ASTM D-1505. In an embodiment, an mREPC suitable for use in this disclosure may have a melt flow rate of from 0.5 g/10 min. to 2000 g/10 min., alternatively from 1 g/10 min. to 1000 g/10 min., and alternatively from 10 g/10 min. to 500 g/10 min., as determined in accordance with ASTM D-1238 condition "L." In an embodiment, a film prepared from an mREPC suitable for use in this disclosure may have a gloss at 45° of from 70 to 95, alternatively from 75 to 90, and alternatively from 80 to 90 as determined in accordance with ASTM D-2457.

An example of a suitable mREPC suitable for use in this disclosure includes without limitation a metallocene catalyzed ethylene-propylene random copolymer known as grade EOD 02-15 available from Total Petrochemicals USA, Inc. In an embodiment, the mREPC (e.g., grade EOD 02-15) generally has the physical properties set forth in Table 4.

TABLE 4

| | Typical Value | ASTM Method |
|---|---|---|
| Resin Properties | | |
| Melt Flow, g/10 min. | 11 | D 1238 |
| Density, g/cc | 0.895 | D 1505 |
| Melting Point, ° F. (° C.) | 246 (119) | DSC[1] |
| Film Properties[1] | | |
| Non-oriented-2 mil (50 μm) | | |
| Haze, % | 0.3 | D 1003 |
| Gloss @ 45°, % | 90 | D 2457 |
| 1% Secant Modulus (MD), psi (MPa) | 50,000 (345) | D 882 |
| Ultimate Tensile Strength (MD), psi (MPa) | 5,000 (35) | D 882 |
| Ultimate Elongation (MD), % | 700 | D882 |
| Heat Seal Temperature[2], ° F. (° C.) | 221 (105) | |

[1]MP determined with a DSC-2 Differential Scanning Calorimeter.
[2]Seal condition: die pressure 60 psi (413 kPa), dwell time 1.0 sec mPP homopolymers may be formed by placing propylene in a suitable reaction vessel in the presence of a metallocene catalyst and/or optionally additives and under suitable reaction conditions for polymerization thereof.

mPP copolymers (i.e., mREPC) may be formed by placing propylene in combination with a co-monomer (e.g., ethylene) in a suitable reaction vessel in the presence of a metallocene catalyst and/or optionally additives and under suitable reaction conditions for polymerization thereof. Preparation of mPPs (i.e., mREPCs) are described in further detail in U.S. Pat. Nos. 5,158,920, 5,416,228, 5,789,502, 5,807,800, 5,968,864, 6,225,251, and 6,432,860, each of which is incorporated herein by reference in its entirety.

In an embodiment, a method of preparing a BPF includes preparing an oPP film and contacting an mPP film with the oPP film to form a multi-layer film (e.g., a bilayer film). In such an embodiment, the oPP film may be prepared by first melting the polypropylene in an extruder. Next, the molten polypropylene is extruded through a slot or a die to form a thin extruded polypropylene film. The extruded polypropylene film is then adhered to a cooled surface, such as a chill roll that may be in contact with a water bath. The chill roll functions to immediately quench the film. The polypropylene film may then be passed through rollers designed to stretch the film in one direction to produce a uniaxially oriented polypropylene film, alternatively in differing axial directions to produce biaxially oriented polypropylene (i.e., BOPP) films. The uniaxially or biaxially oriented film (collectively referred to herein as oPP film) may be further trimmed and rolled for transport or storage. In an embodiment, the oPP film has a thickness of from 0.1 mil to 20 mil, alternatively from 0.25 mil to 20 mil, alternatively from 0.30 mil to 20 mil.

In some embodiments, the oPP film may be subjected to a surface modification process designed to increase the surface tension of the film. Examples of surface modification processes include without limitation corona treatment, flame treatment and plasma treatment. Corona treatment is an electrical process that uses ionized air to increase the surface tension of nonporous substrates. Flame treatment is a process of burning away surface contaminants by forcibly spraying a flame onto a substrate. Plasma treatment is a process of creating plasma in an inert gas to increase surface energy and wetting ability of a substrate. In an embodiment, the oPP film of this disclosure is subjected to corona treatment following extrusion. Methods and conditions for corona treatment of an oPP film are known to one of ordinary skill in the art with the aid of this disclosure.

Examples of suitable oPP films include without limitation TAPEFILM TH20 and TAPEFILM TH30 which are oPP tape films commercially available from OppFilm Fallsington, Pa. In an embodiment, the oPP films (e.g., TAPEFILM TH20, TAPEFILM TH30) have generally the physical properties set forth in Table 5.

TABLE 5

| Properties | Typical Value | | ASTM Method |
| --- | --- | --- | --- |
| | TAPEFILM TH20 | TAPEFILM TH30 | |
| Haze, % | 1.0 | | D 1003 |
| Gloss at 45° | 90 | | D 2457 |
| Dynamic C.O.F (Film/film) | 03 | | D 1894 |
| Tensile strength MD, N/mm$^2$ | 150 | | D 882 |
| Tensile strength TD, N/mm$^2$ | 300 | | D 882 |
| Elongation at break MD, % | 130 | | D 882 |
| Elongation at break TD, % | 50 | | D 882 |
| Modulus MD, N/mm$^2$ | 2000 | | D 882 |
| Modulus TD, N/mm$^2$ | 2800 | | D 882 |
| Wet tension (corona treatment), dinas, cm | 38 | | 2578 |
| Water vapor transmission 38°, 90% HR | 5.6 | 4.7 | F 1249 |
| Oxygen transmission at 22° C., 0% HR | 1800 | 1600 | D 1434 |

After the oPP film is prepared, the method of preparing a BPF may further include extrusion coating an mPP layer onto the oPP film layer. FIG. 1 is a schematic diagram of an extrusion coating apparatus 100 for use in the process of preparing a BPF. Referring to FIG. 1, the process may be carried out by providing an oPP, which is usually in the form of a rolled oPP film 110. The rolled oPP film 110 is unwound using an unwinder 105 where an unrolled oPP film 115 is guided using guide rollers 120 and 125 toward a nip roller 130. Next, an mPP 140 is melted and extruded through a die 135 at a temperature of from 420° F. to 530° F., alternatively from 440° F. to 520° F., alternatively from 490° F. to 510° F. The extruded mPP 140 is then laid onto (i.e., contacted with) the unrolled oPP film 115 at a nip 150. Contacting of the mPP 140 and the oPP film 110 at nip 150 at adequate pressure causes the mPP 140 to adhere to the oPP film 115 to form a BPF 155. In an embodiment, the apparatus is configured such that the pressure applied may be adjusted to meet a process-desired need. The BPF 155 is then passed onto a cooling cylinder such as a chilled roll 145, and guided with guide roller 160 towards rollers 165. From rollers 165, the BPF 155 is wound using winder 170 and collected as a rolled BPF film 175.

The oPP film layer may have a thickness of from 0.1 mil to 20 mil, alternatively from 0.25 mil to 20 mil, alternatively from 0.3 mil to 20 mil. The mPP film layer may have a thickness of from 0.1 mil to 20 mil, alternatively from 0.25 mil to 20 mil, alternatively from 0.3 mil to 20 mil. In such embodiments, the resultant BPF having an oPP film layer and a mPP film layer has a thickness of from 0.2 mil to 20 mil, alternatively from 0.25 mil to 20 mil, alternatively from 0.3 mil to 20 mil.

In an embodiment, a BPF of the type described herein may include an oPP, an mPP and a tie layer. Alternatively the BPF does not include a tie layer. Tie layers are adhesive layers that are typically added to improve the adhesion between two materials.

The BPF comprising an mPP film layer and an oPP film layer of the type described herein may have display a number of desirable physical and/or optical properties. In an embodiment, the BPFs of the type described herein have a haze percentage of from 0.5% to 10%, or from 1% to 9%, or from 1.5% to 7%. Haze is the cloudy appearance of a material caused by light scattered from within the material or from its surface. The haze of a material can be determined in accordance with ASTM D1003-00 for a haze percentage of equal to or lower than 30%. A material having a haze percentage of greater than 30% can be determined in accordance with ASTM E167.

In an embodiment, BPFs of the type described herein may have a gloss 45° of from 60 to 99, or from 61 to 98, or from 62 to 95. The gloss of a material is based on the interaction of light with the surface of a material, more specifically the ability of the surface to reflect light in a specular direction. Gloss is measured by measuring the degree of gloss as a function of the angle of the incident light, for example at 45° incident angle (also known as "gloss 45°"), and may be determined in accordance with ASTM D2457.

In an embodiment, a BPF of the type described herein may be used in thermo-lamination applications to form laminates. In such an embodiment, the BPF may be applied to a substrate, wherein the mPP film layer is disposed between the oPP film layer and the substrate, and then heated to form a laminate. The substrate may include any suitable substrate such as paper, plastic, metal, wood, fabric, glass, or combinations thereof. In thermo-lamination applications, the mPP film layer of the BPF may function as a heat seal layer.

In an embodiment, a laminate is formed which has a substrate, an mPP film layer and an oPP film layer of the type described herein. In an embodiment, the laminate includes less than 1 wt. % EVA, alternatively less than 0.5, 0.1, 0.01, 0.001 or 0.001 wt. % EVA. Alternatively, the laminate is substantially free of EVA.

The laminate including a BPF having an mPP film layer and an oPP film layer of the type described herein may display desirable mechanical properties. In an embodiment, the laminate may exhibit an adhesive strength of from 0.1 lb_f to 10 lb_f, alternatively from 0.25 lb_f to 9 lb_f, alternatively from 0.5 lb_f to 7 lb_f based on a 180° peel strength test.

Figure 2A:
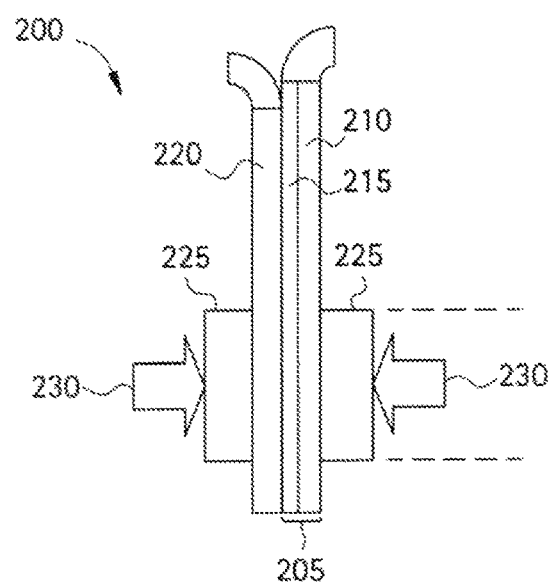
FIGS. 2A and 2B illustrate a 180° peel force test.
Figure 2B:
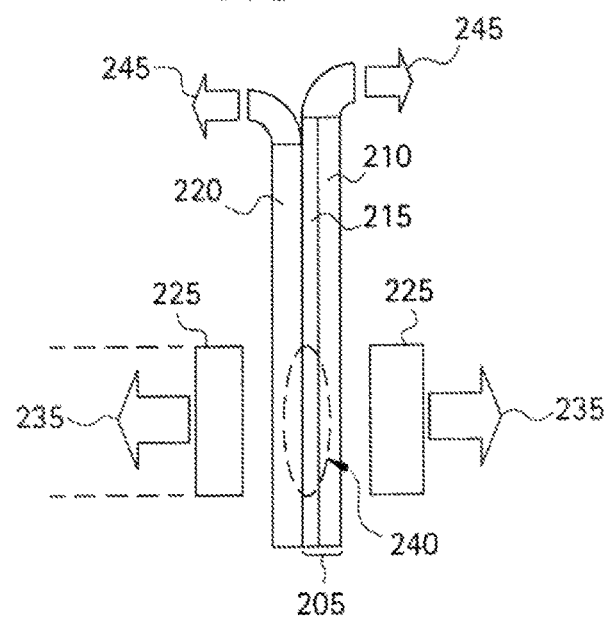

FIGS. 2A and 2B illustrate a 180° peel strength test 200. Referring to FIG. 2A, the test 200 is carried out by contacting a BPF 205 comprising an oPP film layer 210 and an mPP film layer 215 with a substrate such as a bond paper 220 wherein the mPP film layer 215 of the BPF 205 is facing the bond paper 220. Next, two heated bars 225 are pressed (arrows 230) onto the BPF 205 and the bond paper 220 at a temperature of 90° C. for one second. Referring now to FIG. 2B, the heated bars 225 are then removed (arrows 235) and a laminate 240 is formed. The laminate 240 is cooled for one minute. Next, the BPF 205 is peeled off from the bond paper 220 by applying two opposing forces 245. Any suitable tensile tester unit such as a 5500R Model 1122 commercially available from INSTRON may be used to conduct the peel strength experiment.

The BPFs of this disclosure may be converted to various end-use articles. Examples of end use articles into which the BPFs of this disclosure may be formed include laminates (for packaging, printed papers, etc.), laminate flooring compositions, polymeric foam substrate, decorative surfaces (e.g., crown molding, etc.), weatherable outdoor materials, point-of-purchase signs and displays, housewares and consumer goods, cosmetics packaging, outdoor replacement materials, lids and containers (i.e., for deli, fruit, candies and cookies), appliances, utensils, and the like.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner.

Example 1

The strength of adhesion for a BPF comprising an mPP film layer and a BOPP film layer produced at 440° F. was investigated. A BPF sample, designated Sample 1, was prepared. The BOPP film used was a corona treated BOPP film from OppFilm, Lima, Peru. The mPP used was EOD02-15, which is an mPP with an SIT of 105° C. available from Total Petrochemicals USA, Inc. No tie layer was used between the mPP and BOPP film.

The sample was produced by extrusion coating an mPP layer onto the BOPP film using a laboratory extruder as described previously with reference to FIG. 1. The details of processing parameters including temperatures, pressures, die gap, and screw speed for all samples are tabulated in Table 6. The thickness of the mPP film was adjusted by adjusting the line speed resulting in an mPP layer that was approximately 1 mil (25 μm) thick. The final BPF thickness was 2.0 mil (50 μm).

TABLE 6

| Parameter | |
|---|---|
| Zone 1 temperature | 370° F. |
| Zone 2 temperature | 400° F. |
| Zone 3 temperature | 415° F. |
| Zone 4 temperature | 440° F. |
| Clamp ring temperature | 440° F. |
| Adaptor temperature | 440° F. |

TABLE 6-continued

| Parameter | |
|---|---|
| Feedblock temperature | 440° F. |
| Die temperature | 440° F. |
| Melt temperature | 408° F. |
| Melt pressure | 290 psig |
| Die gap | 10 mil |
| Screw speed | 8 rpm |
| Nip roll pressure | 50 psig |
| Chilled roll pressure | 40 psig |
| Film speed | 20 ft/min |

The adhesion strength of Sample 1 was determined by measuring the 180° peel force as discussed previously herein with reference to FIG. 2. The experiment was repeated six times. FIG. 3 shows the 180° peel force as a function of extension.

Example 2

The strength of adhesion between an mPP layer and a BOPP layer of a BPF produced at 500° F. was investigated. A bi-layer film sample, designated Sample 2, was prepared. The component materials and method of producing the bilayer film were described in Example 1. The details of processing parameters including temperatures, pressures, die gap, and screw speed for all samples are tabulated in Table 7. The thickness of the mPP film was adjusted by adjusting the line speed resulting in an mPP layer that was approximately 1 mil (25 μm) thick. The final BPF thickness was 2 mil.

TABLE 7

| Parameter | Samples 7-12 |
|---|---|
| Zone 1 temperature | 370° F. |
| Zone 2 temperature | 400° F. |
| Zone 3 temperature | 415° F. |
| Zone 4 temperature | 450° F. |
| Clamp ring temperature | 500° F. |
| Adaptor temperature | 510° F. |
| Feedblock temperature | 510° F. |
| Die temperature | 510° F. |
| Melt temperature | 427° F. |
| Melt pressure | 350 psig |
| Die gap | 10 mil |
| Screw speed | 12 rpm |
| Nip roll pressure | 50 psig |
| Chilled roll pressure | 40 psig |
| Film speed | 20 ft/min |

The adhesive strength of Sample 2 was determined by measuring the 180° peel force and the experiment was repeated six times. FIG. 4 shows the 180° peel force as a function of extension.

The results demonstrated that the 180° peel forces were higher for Sample 2 when compared to Sample 1 from Example 1. The results suggest that EOD02-15 has a greater adhesive strength when coated at 500° F. instead of 440° F. as shown in Example 1.

Example 3

The strength of adhesion between an mPP and a BOPP of a BPF produced at 440° F. was investigated using an mPP having a lower SIT. A bi-layer film sample, designated Sample 3, was prepared. The BOPP used was that described in Example 1 and the mPP was EOD07-21, which is an mPP with a SIT of 98° C. available from Total Petrochemicals USA, Inc. The details of processing parameters including temperatures, pressures, die gap, and screw speed for Sample 3 are tabulated in Table 6. The thickness of the mPP film was adjusted by adjusting the line speed so resulting in an mPP layer that was approximately 1 mil (25 µm) thick. The final BPF thickness was 2.0 mil.

The adhesive strength of Sample 3 was determined by measuring the 180° peel force and the experiment was repeated five times. FIG. 5 shows the 180° peel force as a function of extension. The results demonstrated that the 180° peel forces were not higher for Sample 3 when compared to Sample 1 from Example 1.

Example 4

A bi-layer film sample, designated Sample 4, was prepared. The BOPP and the mPP used were similar to those used Example 3. The bilayer films (approximately 1 mil thick) were produced using procedures similar to those described in Example 1. The details of processing parameters including temperatures, pressures, die gap, and screw speed were similar to Example 2 which are tabulated in Table 7.

Sample 4 was tested for the adhesion by measuring the 180° peel force and the experiment was repeated 7 times. FIG. 6 shows the 180° peel force as a function of extension. The results demonstrate that the 180° peel forces were lower for Sample 4 when compared to Sample 2 from Example 2. The results were surprising since EOD07-21 has a lower SIT than EOD02-15. In addition, the increase in peel force trend observed by increasing the processing temperature from 440° F. to 500° F. as shown in Examples 1 and 2 was not observed for Examples 3 and 4.

Example 5

The haze and gloss of Samples 1-4 from Examples 1-4 were determined. The results are tabulated in Table 8.

TABLE 8

|  | Sample 1 | Sample 2 | Sample 3 | Sample 4 |
| --- | --- | --- | --- | --- |
| Haze % | 6.3 | 6 | 5.4 | 1.8 |
| Haze std. dev | 0.18 | 0.16 | 0.19 | 0.95 |
| Gloss 45° | 79 | 64 | 68.8 | 83.3 |
| Gloss 45° std. dev | 4.4 | 5.6 | 6.4 | 3.2 |

The results demonstrated that significantly clear and glossy film structures can be produced with either EOD02-15 or EOD07-21.

Example 6

Figure 7:
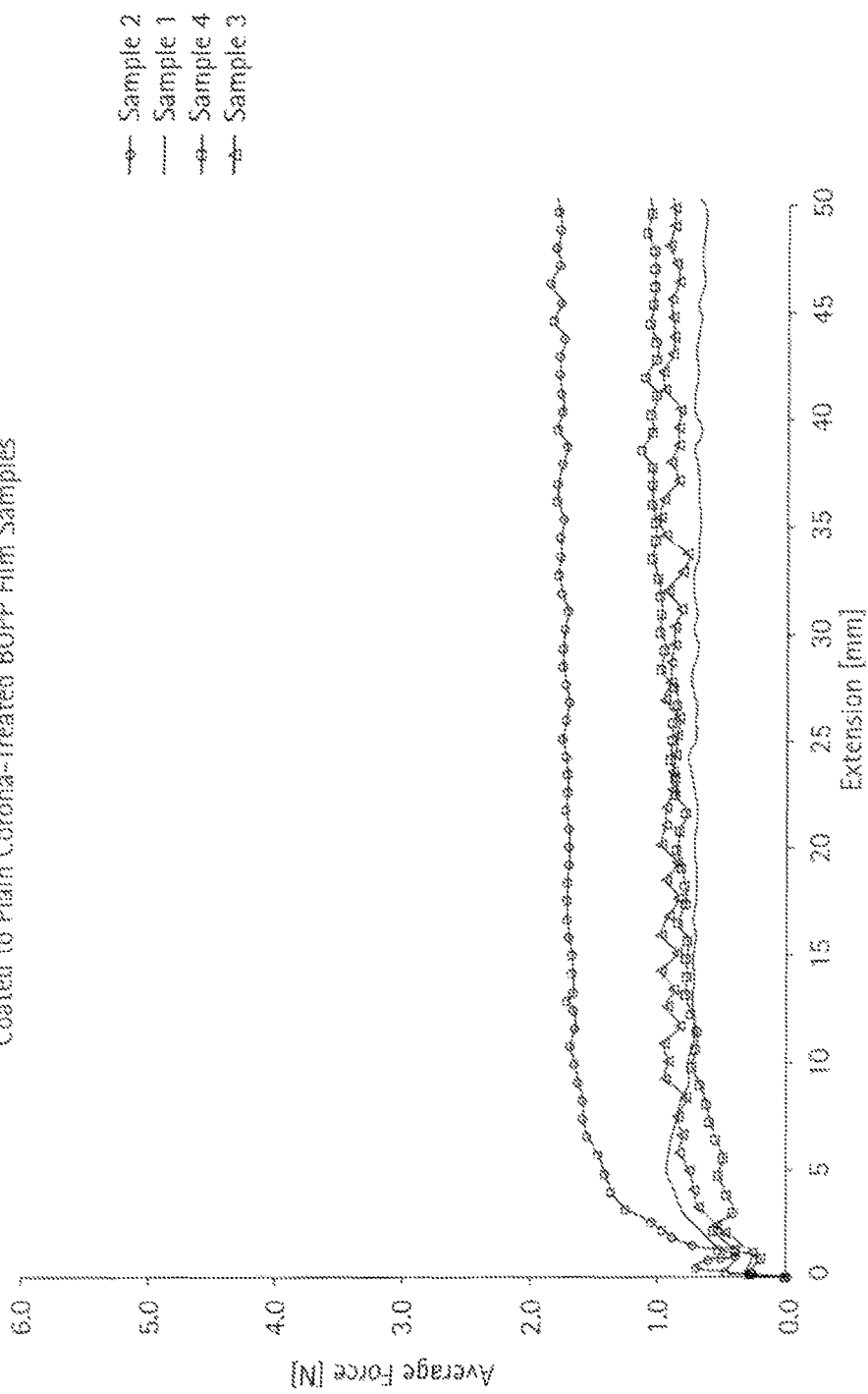
FIG. 7 is a plot of average force as a function of extension for the 180° peel test results for Samples 1-4 from Examples 1-4.
Figure 8:
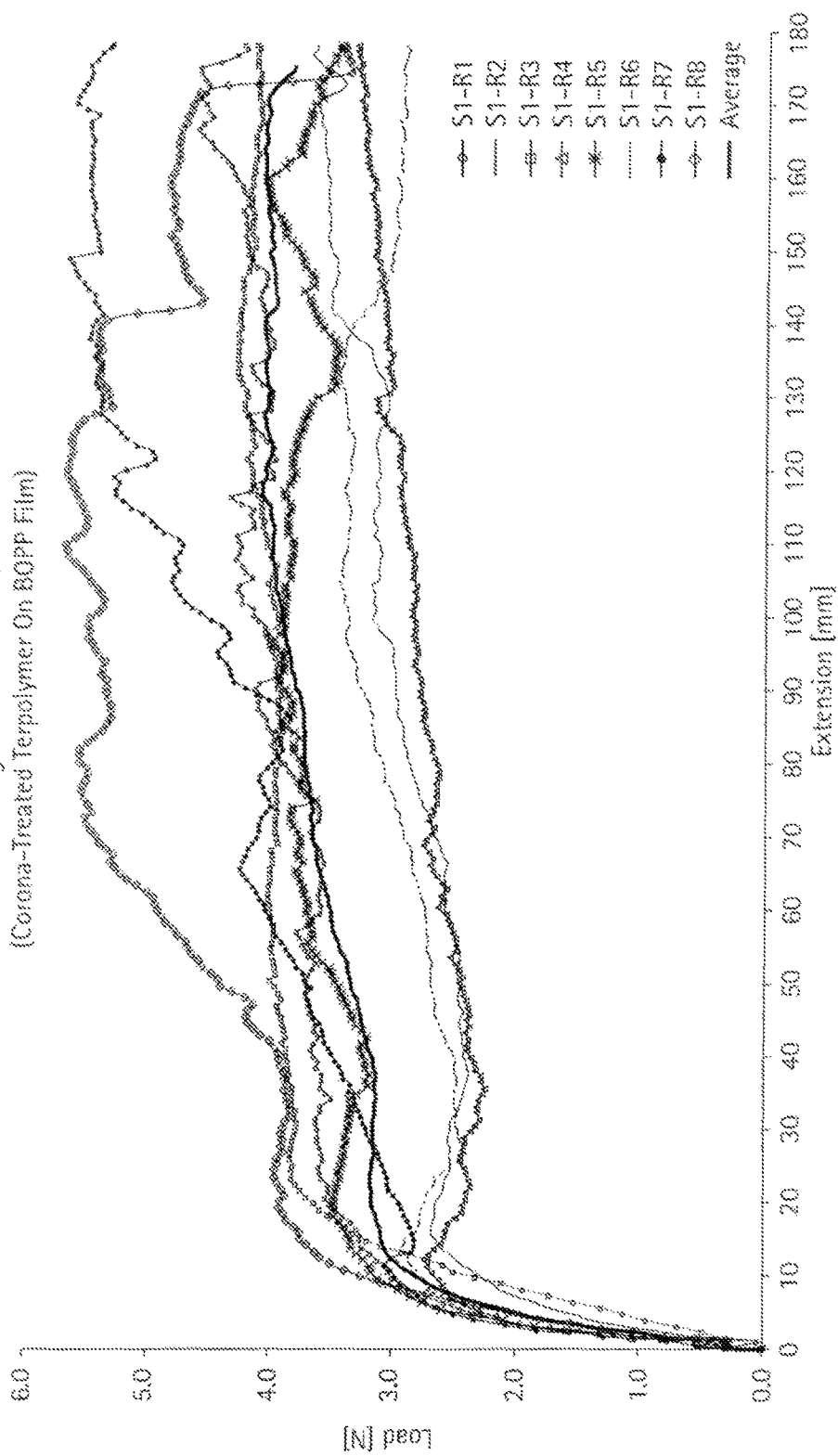
FIGS. 8-11 are plots of force as a function of extension for the 180° peel test results for Samples 9-12 from Example 7.
Figure 9:
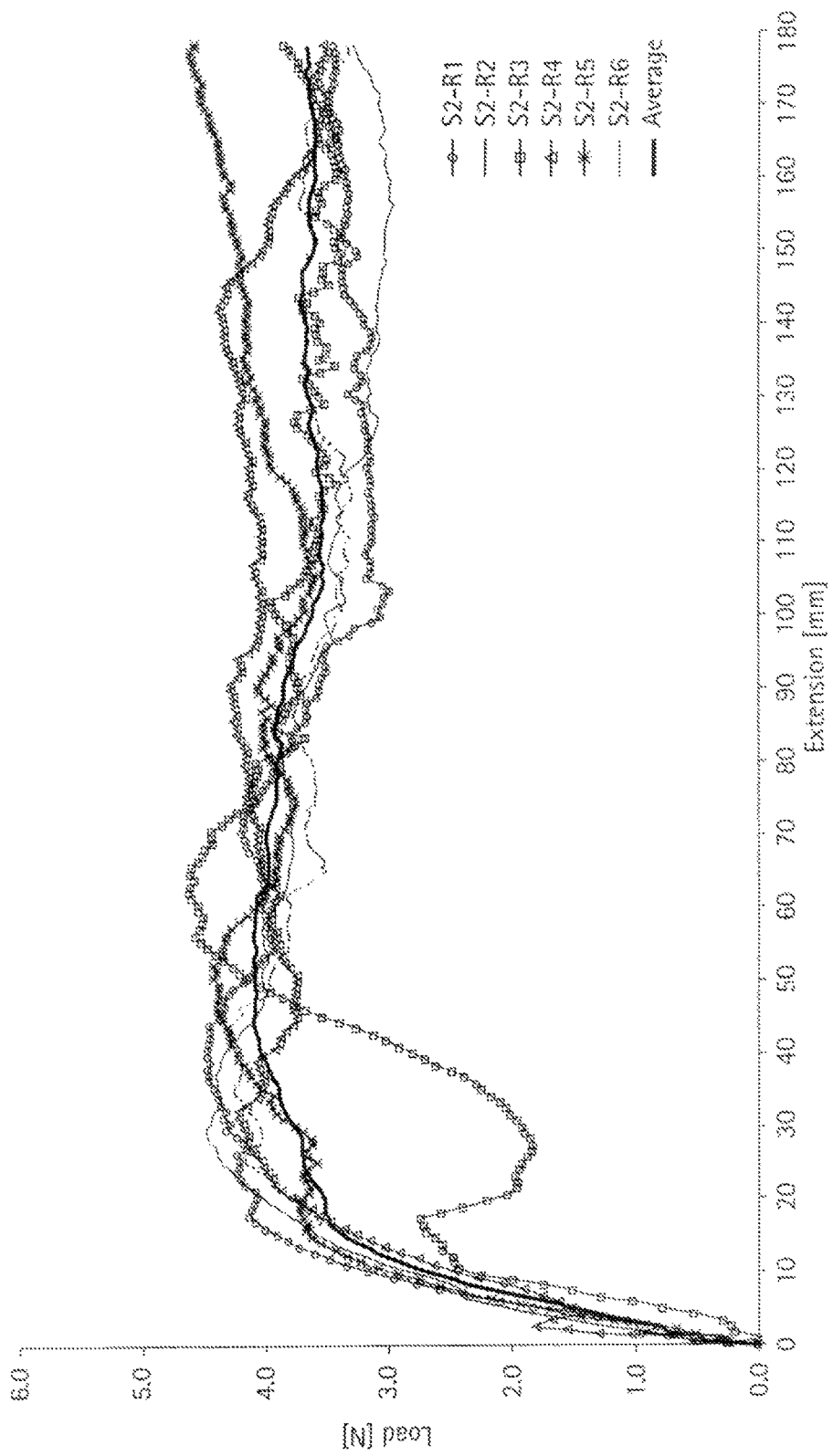
Figure 10:
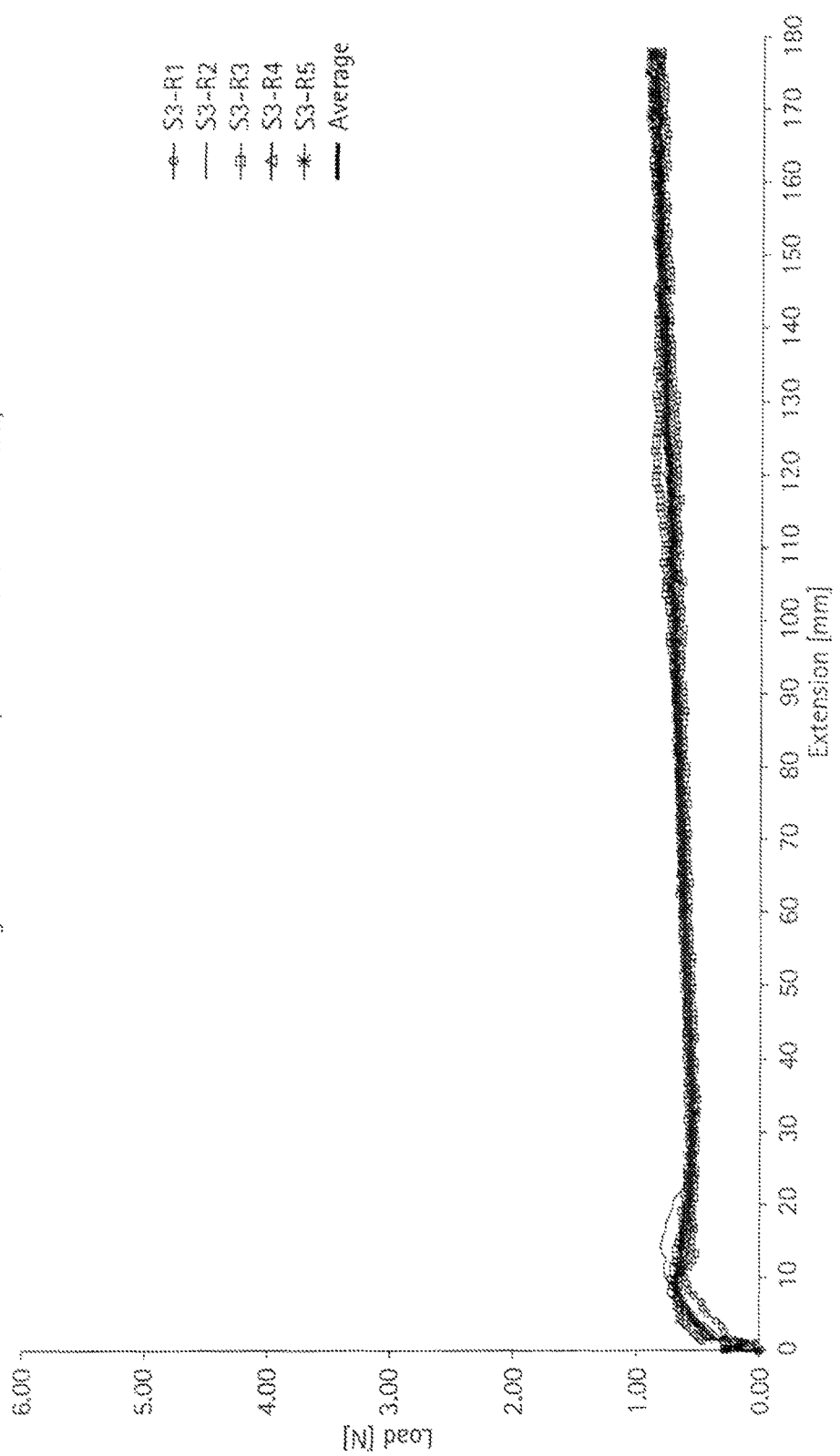
Figure 11:
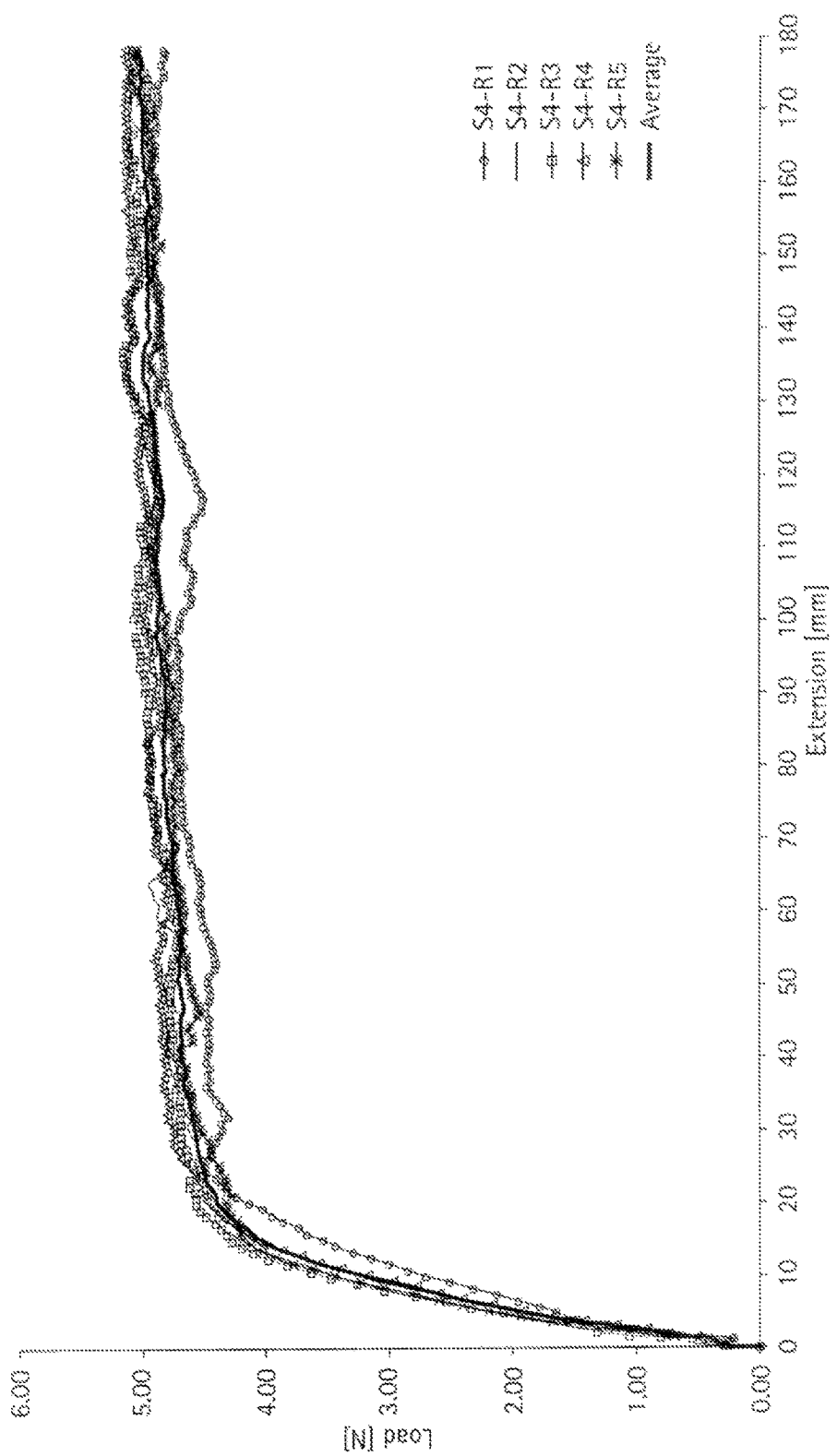

The average 180° peel force for Samples 1-4 from Examples 1-4 were determined. The results are shown in FIG. 7, which is a plot of average 180° peel force as a function of extension. Referring to FIG. 7, EOD02-15 extrusion coated at 500° F. (Sample 2) shows a higher average 180° peel force than the other samples, which suggests that EOD02-15 extrusion coated at 500° F. had higher adhesion strength to BOPP films.

Example 7

Films comprising a BOPP layer and an EVA coating with differing tie layers were prepared and the adhesion of the BOPP and EVA compared. Four films, designated Samples 5-8, were prepared using EOD05-07 as the base resin. EOD 05-07 is a polypropylene resin commercially available from Total Petrochemicals USA, Inc. Sample 5 included the BOPP film and a tie layer having a corona treated Basell 7432 resin. Basell 7432 is an ethylene-butylene-propylene terpolymer layer commercially available from Basell Service Co, The Netherlands. Sample 6 had the BOPP film and a tie layer including a corona treated HLDPE FH35 SC35 resin. HLDPE FH35 SC35 is a medium density polyethylene layer commercially available from Braskem, Brazil. Sample 7 had a corona treated BOPP film without a tie layer. Sample 8 had a BOPP film and a tie layer including a corona treated Basell 7416. Basell 7416 is an ethylene propylene copolymer layer, commercially available from Basell Service Co, The Netherlands. The thickness of the BOPP films was 0.0010 in. The surface tension of the corona-treated side of all samples was measured using AccuDyne Test Ink and the results are tabulated in Table 9.

TABLE 9

| Sample | Surface Tension (dyne/cm) |
| --- | --- |
| 5 | ~57 |
| 6 | >69 |
| 7 | >69 |
| 8 | >69 |

Next, Samples 5-8 were extrusion coated with a 1 mil (~25 µm) thick EVA layer to form Samples 9-12 using a similar procedure described previously. The EVA was ELVAX 460 resin, which is a commercially available 18% vinyl acetate EVA resin from DuPont, North America. The details of processing parameters including temperatures, pressures, die gap, and screw speed for all samples are tabulated in Table 10.

TABLE 10

| Parameter | Samples 7-12 |
| --- | --- |
| Zone 1 temperature | 370° F. |
| Zone 2 temperature | 400° F. |
| Zone 3 temperature | 415° F. |
| Zone 4 temperature | 450° F. |
| Clamp ring temperature | 470° F. |
| Adaptor temperature | 470° F. |
| Feedblock temperature | 470° F. |
| Die temperature | 470° F. |
| Melt temperature | 428° F. |
| Melt pressure | ~1900 psig |
| Die gap | 10 mil |
| Screw speed | 23 rpm |
| Nip roll pressure (L/R) | 50/60 psig |
| Take-off top roll temperature | 55° F. |

Figure 12:
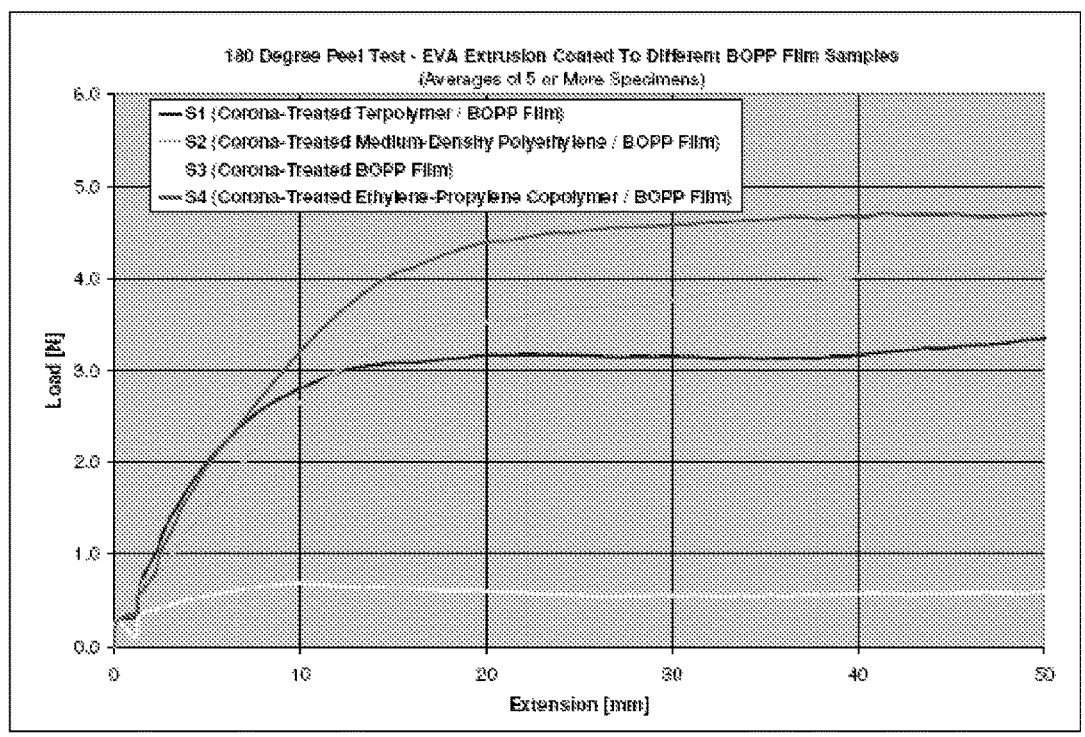
FIG. 12 is a plot of average force as a function of extension for the 180° peel test results for Samples 9-12 from Example 7.
Figure 13:
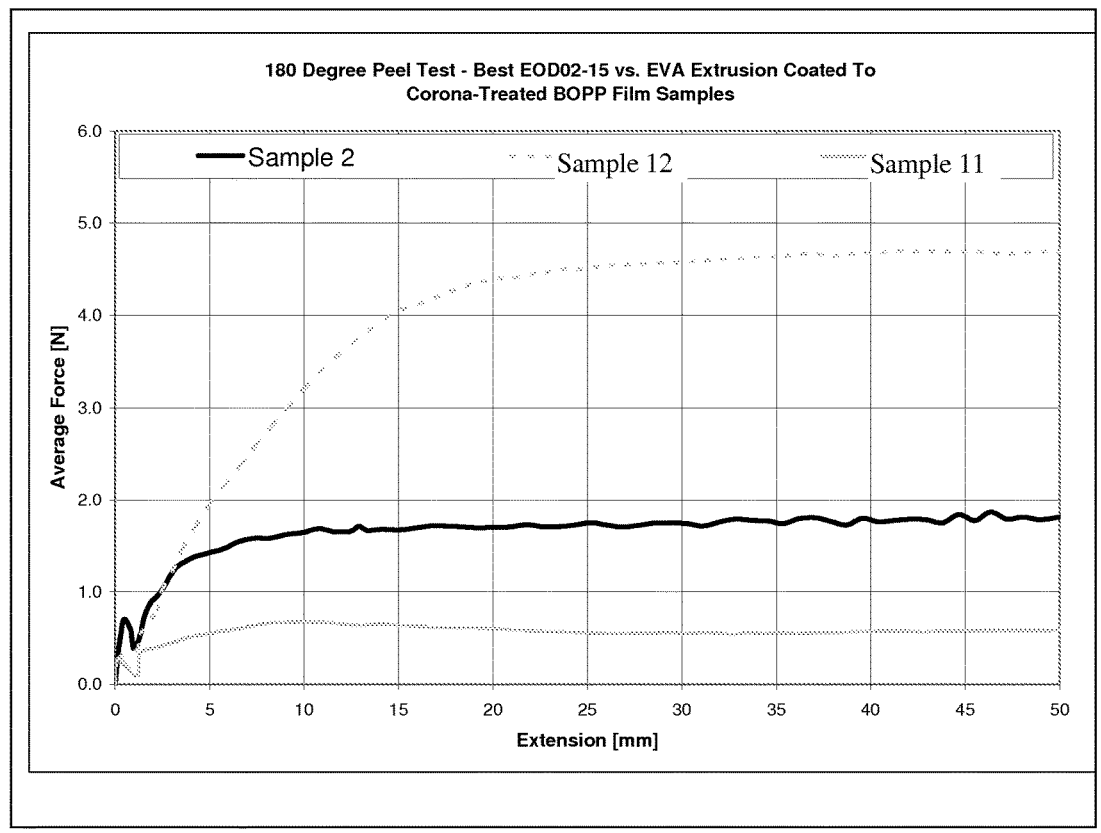
FIG. 13 is a plot of average force as a function of extension for the 180° peel test results for Sample 2, 11, and 12 from Examples 2 and 7.

Paper separators were manually attached to the BOPP film at regular intervals upstream of the extrusion die during the coating process to provide separation points between the EVA coating and the BOPP film. The 180° peel tests were conducted on Samples 9-12 and were repeated between 5-8 times. The results for Samples 9-12 are shown in FIGS. 8-11 respectively. FIG. 12 shows the average 180° peel force as a function of extension for Samples 9-12.

The results demonstrate that EVA adheres strongly to the BOPP film comprising a corona treated ethylene propylene copolymer tie layer (Sample 12) and poorly to the corona treated BOPP homopolymer (Sample 11). The results further demonstrate that a mPP of the type described herein (e.g., EOD02-15) exhibits increased adhesion to a corona treated BOPP surface than an 18% EVA material. The clarity and low melting point of an MPP of the type described herein could prove highly beneficial for certain lamination applications. Furthermore, the simplicity of a bi-layer sealable material, when compare to a tri-layer EVA/RCP/BOPP material, may also beneficially impact the costs associated with the production of laminates.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. An article produced by a method comprising:
 forming a bilayer polymer film comprising a biaxially oriented polypropylene film and a metallocene-catalyzed polypropylene film, wherein the metallocene-catalyzed polypropylene film has a seal initiation temperature of between 105° C. and 120° C., wherein the metallocene catalyzed polypropylene film comprises metallocene catalyzed ethylene-propylene random copolymer having a melt flow rate of from 10 g/10 min to 500 g/10 min, and wherein the laminate does not include a tie layer between the biaxially oriented polypropylene film and the metallocene-catalyzed polypropylene film.

2. A laminate comprising:
 a biaxially oriented polypropylene film, a metallocene-catalyzed polypropylene film, and a substrate, wherein the metallocene-catalyzed polypropylene film is disposed between the biaxially oriented polypropylene film and the substrate, and wherein the metallocene-catalyzed polypropylene film has a seal initiation temperature of from 105° C. to 130° C., wherein the metallocene-catalyzed polypropylene film has a seal initiation temperature of between 105° C. and 120° C., wherein the metallocene-catalyzed polypropylene film comprises metallocene catalyzed ethylene-propylene random copolymer having a melt flow rate of from 10 g/10 min to 500 g/10 min, and wherein the laminate does not include a tie layer between the biaxially oriented polypropylene film and the metallocene-catalyzed polypropylene film.

3. The laminate of claim 2, wherein the metallocene-catalyzed polypropylene film has a seal initiation temperature of from 105° C. to 120° C.

4. The laminate of claim 2, wherein the laminate 1s substantially free of ethylene-vinyl-acetate.

5. The laminate of claim 2, wherein the biaxially oriented polypropylene film is subjected to a surface modification process.

6. The laminate of claim 5, wherein the surface modification process comprises corona treatment, flame treatment, or plasma treatment.

7. The laminate of claim 2, wherein the substrate is paper, plastic, metal, wood, fabric, glass, or combinations thereof.

8. The laminate of claim 2, wherein the laminate exhibits an adhesive strength of from 0.1 $lb_f$ to 10 $lb_f$ based on a 180° peel strength test.

9. The laminate of claim 2, wherein the laminate comprises less than 1 weight percent ethylene-vinyl-acetate.

10. The article of claim 1, wherein the metallocene-catalyzed polypropylene film has a seal initiation temperature of from 105° C. to 120° C.

11. The article of claim 9, wherein the metallocene-catalyzed polypropylene film comprises metallocene catalyzed ethylene-propylene random copolymer having a melt flow rate of from 10 g/10 min to 500 g/10 min, wherein the bilayer polymer film does not include a tie layer between the oriented polypropylene film and the metallocene-catalyzed polypropylene film, and wherein the bilayer polymer film has a haze percentage of from 1.5% to 7%.

12. A bilayer film comprising:
 a biaxially oriented polypropylene film; and
 a metallocene-catalyzed polypropylene film, wherein the metallocene-catalyzed polypropylene film has a seal initiation temperature of between 105° C. and 120° C., wherein the metallocene-catalyzed polypropylene film comprises metallocene catalyzed ethylene-propylene random copolymer having a melt flow rate of from 10 g/10 min to 500 g/10 min, and wherein the laminate does not include a tie layer between the biaxially oriented polypropylene film and the metallocene-catalyzed polypropylene film.

* * * * *